Figure 1:
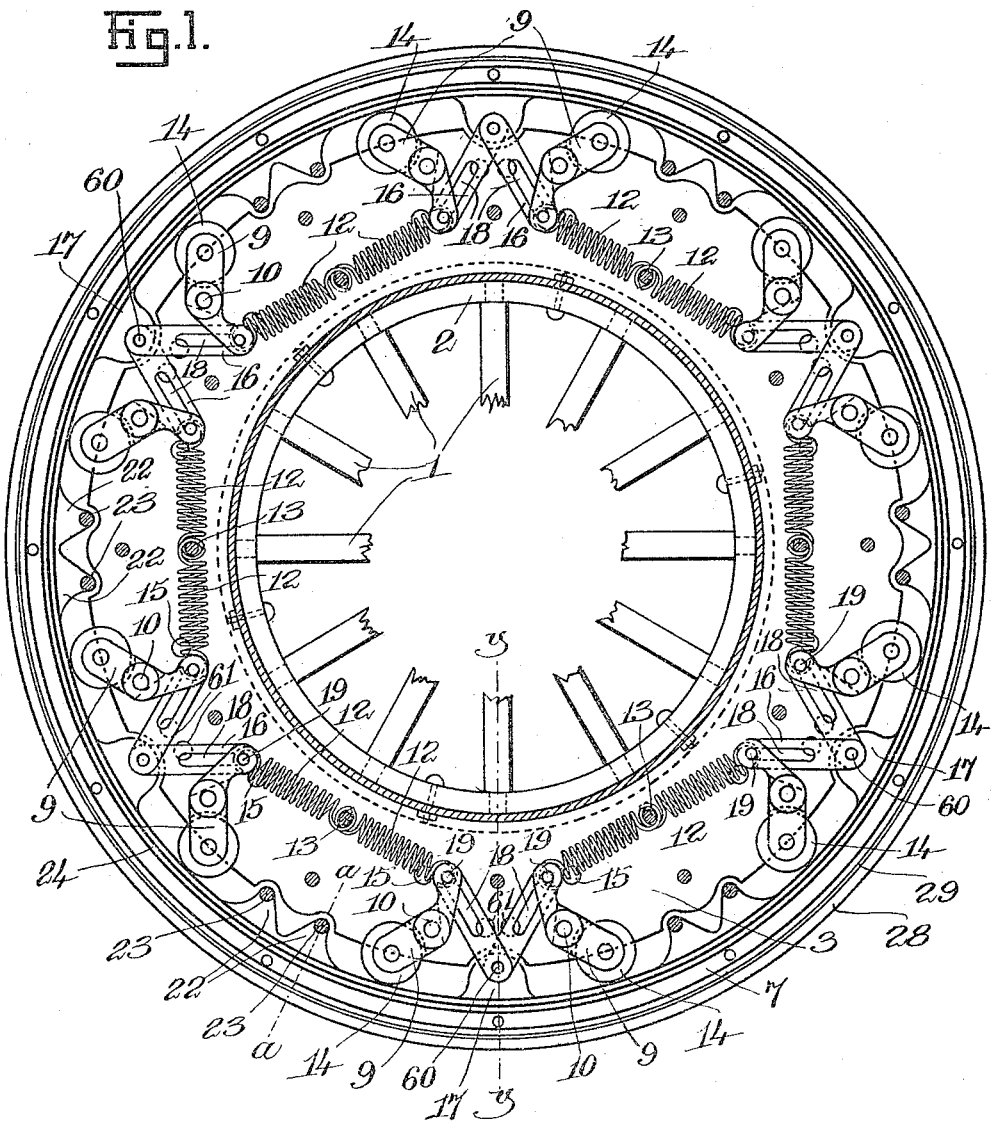

J. A. & C. W. STAHLE.
RESILIENT WHEEL.
APPLICATION FILED JAN. 9, 1911.

1,124,350.

Patented Jan. 12, 1915.
3 SHEETS—SHEET 1.

WITNESSES:
Carl G. Johnson
Sigfrid Swenson

INVENTORS:
John A. Stahle
Carl W. Stahle
by Edwards, Head & Smith
Att'ys.

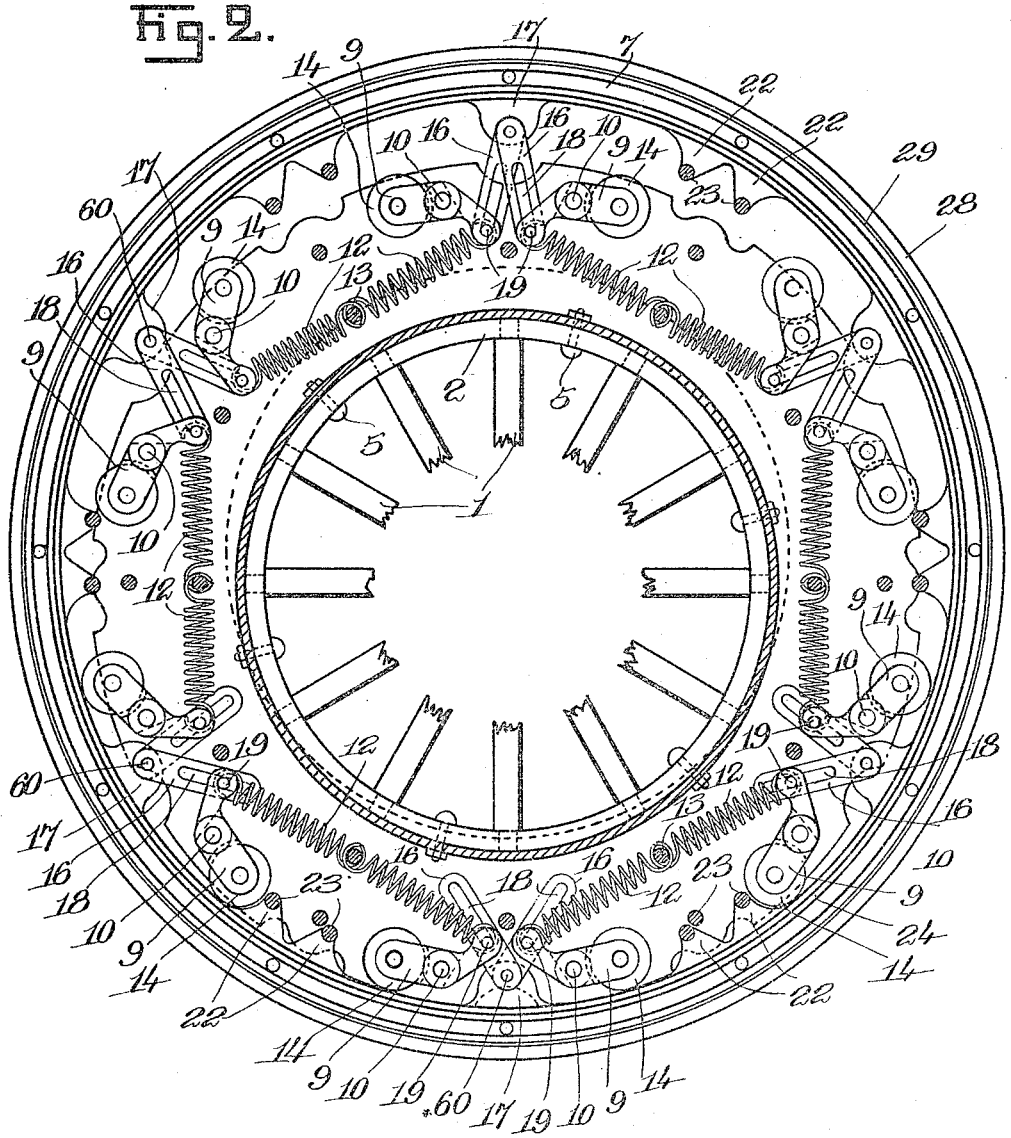

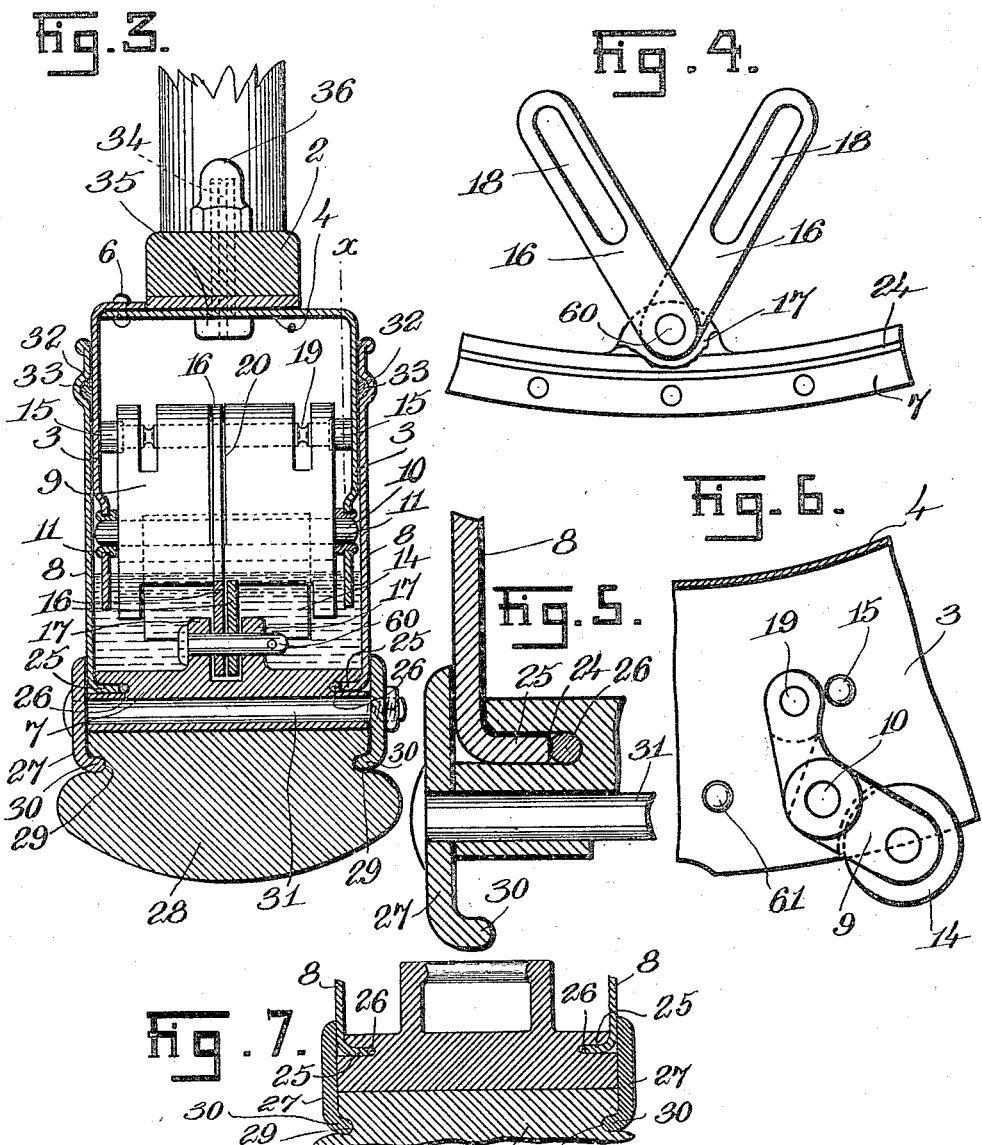

UNITED STATES PATENT OFFICE.

JOHN A. STAHLE, OF BOSTON, AND CARL W. STAHLE, OF EVERETT, MASSACHUSETTS, ASSIGNORS, BY MESNE ASSIGNMENTS, TO STAHLE MECHANICAL TIRE COMPANY, LIMITED, A CORPORATION OF MAINE.

RESILIENT WHEEL.

1,124,350.  Specification of Letters Patent.  Patented Jan. 12, 1915.

Application filed January 9, 1911. Serial No. 601,721.

*To all whom it may concern:*

Be it known that we, JOHN A. STAHLE and CARL W. STAHLE, citizens of the United States, residing at Boston, county of Suffolk, State of Massachusetts, and Everett, county of Middlesex, State of Massachusetts, respectively, have invented an Improvement in Resilient Wheels, of which the following description, in connection with the accompanying drawing, is a specification, like characters on the drawing representing like parts.

This invention relates to resilient wheels of that type which embody a wheel body, an exterior rim encircling the wheel body and separate therefrom, and yielding load-sustaining members pivoted to the wheel body and adapted to bear against the rim and by their yielding movement to give the desired resiliency to the wheel. A resilient wheel of this general type is illustrated in our co-pending application Se. No. 554,017, filed April 7, 1910. In said wheel the load-supporting members are in the form of levers centrally pivoted between flanges extending outwardly from the wheel body and carrying at their outer ends rolls which bear against the inner face of the exterior rim, and the inner ends of the levers are acted upon by springs which tend to hold the rolls against the rim but which yield to permit a relative movement of the wheel body and rim as the load is applied to the wheel. These springs are so arranged that when the wheel is loaded the springs at the lower side of the wheel only come into play to resiliently support the load and to assist these springs in resiliently supporting the load we have embodied in the device of said application a second series of radially-extending contracting spiral springs which connect the rim with the wheel body and which are arranged so that when the wheel is loaded the radially-extending springs that are on the upper side of the wheel assist in resiliently supporting the latter. In the device of said application, therefore, there are two sets of springs, the springs of one set coming into play when they are on the under side of the wheel, and the springs of the other set coming into play when they are on the upper side of the wheel.

The present invention is in the nature of an improvement on the device shown in our prior application and the one feature of the improvement consists in doing away with the second set of radially-extending springs and providing means whereby the springs that act against the load-supporting members are brought into play to assist in resiliently supporting the load when they are on the upper side as well as when they are on the under side thereof.

Another feature of our invention relates to a construction and arrangement of the load-supporting spring by which all of the springs are brought into play at all times for supporting the load regardless of their position in the wheel. In many resilient wheels the load is supported by a few springs only and most of the spring are idle except when they are brought into a certain position as the wheel rotates. With our invention, on the other hand, all of the springs are active all the time and this is a decided advantage.

Other features of the present invention relate to the constructional details of the parts and the manner of associating the rim with the wheel body, all as more fully hereinafter described and then pointed out in the appended claims.

Referring to the drawings wherein we have shown a selected embodiment of our invention, Figure 1 is a sectional view through a wheel embodying the invention, the section being taken on a line corresponding substantially to the line $x$—$x$ on Fig. 3, but showing the exterior rim in side elevation; Fig. 2 is a view similar to Fig. 1 showing the position of the parts when the wheel is sustaining a load; Fig. 3 is an enlarged section on substantially the line $y$—$y$, Fig. 1; Fig. 4 is a detail of the connection between the exterior rim and the load-supporting members; Fig. 5 is an enlarged section through one side of the exterior rim showing the manner of connecting the side plates thereto; Fig. 6 is a detail of one of the load-supporting members; Fig. 7 is an enlarged section on substantially the line $a$—$a$, Fig. 1.

The wheel body is shown generally at 1 and it comprises the usual hub (not shown) and spokes and a felly 2 of usual construction. This felly has extending therefrom two flanges 3 which form between them a channel or space between which the load-supporting members are pivoted. The flanges 3 may be secured to the wheel body in any suitable way and as herein shown one of the flanges has formed integral therewith a ring portion 4 which encircles and is bolted to the felly 2 by means of bolts 5 or other fastenings, and the other flange 3 is riveted to the ring 4, as shown at 6. This particular manner of making the flanges, however, is not essential. The exterior rim is shown at 7 and it encircles the wheel body and is provided with inwardly-directed flanges 8 which overlap the flanges 3, as seen best in Fig. 3.

The load-supporting members are shown at 9 and are somewhat similar in shape to the corresponding members in our above-mentioned application. Each load-supporting member is pivoted intermediate of its ends between the flanges 3, and this may conveniently be done by extending through each member 9 a pivotal pin 10 which is of sufficient length so that the ends thereof may be journaled in the flanges 3. As herein shown we have provided the flanges with bearings 11 in which the ends of the pins 10 are received. Each load-supporting member 9 is acted on by one or more springs 12 which tend to throw the outer end thereof outwardly, and in the present embodiment we have arranged these springs as in our co-pending application, that is, the springs are in the nature of contracting spiral springs which are connected at one end to the inner ends of the load-supporting members and are connected at their other ends to cross bars 13 which extend across between the flanges 3. In the preferred arrangement we will place one cross bar 13 between the load-supporting members of each pair and will connect the springs 12 for each pair of members to each cross bar 13. The outer ends of each of the load-supporting members carry a roll 14 as in our prior application.

When the wheel is in its normal condition the parts are substantially as shown in Fig. 1, that is, the wheel body and the rim are substantially concentrically arranged and each load-supporting member is substantially in contact with the inner face of the exterior rim 7. When the wheel is sustaining a load the wheel body will move downwardly relative to the exterior rim, as shown in Fig. 2, and during such movement the load-supporting members on the underside of the wheel will be turned thereby putting the corresponding springs 12 under tension, all as described in our prior application.

We have herein shown stops for limiting the turning movement of the load-supporting members in either direction, such stops being in the nature of projections 15 and 61 which extend inwardly from the flanges 3, the stops 15 serving to limit the swinging movement of said members in one direction and the stops 61 limiting the swinging movement in the opposite direction.

In order to bring into play the springs 12 on the upper side of the wheel as well as those on the lower side of the wheel for resiliently supporting the load, we have connected the inner end of each load-supporting member with the exterior rim so that when any portion of the periphery of the wheel body moves away from the adjacent portion of the wheel rim 7, as occurs at the upper side of the wheel, the adjacent load-supporting members are turned so as to put the corresponding springs 12 under tension. In the present embodiment this connection is provided for by links 16 which are pivotally connected to projections 17 extending inwardly from the exterior rim 7 and are pivotally connected to the inner ends of the load-supporting members 9. We have provided a sliding pivotal connection between each link and its load-supporting member, and in the present embodiment this is secured by forming each link with a slot 18 through which extends a pin 19 carried by the load-supporting members. The load-supporting members may each be provided with a slot 20 in which the link 16 is received, as clearly seen in Fig. 3. With this arrangement whenever the wheel supports the load, as shown in Fig. 2, the load-supporting members on the under side of the wheel will be turned into the position shown in said figure, and during such movement the pivotal pins 19 will slide down the slots 18 in the links 16. The movement of the upper portion of the wheel body away from the exterior rim 7 will cause the links 16 to act on the load-supporting members 9 at the upper side of the wheel and will turn said load-supporting members as shown in Fig. 2, thus placing their springs 12 under tension. It will thus be seen that by means of the connections 16 the springs 12 at both the upper and under side of the wheel will be brought into play to yieldingly support the load.

The exterior rim 7 is provided on its interior face with stops 22 against which the rolls 14 engage thereby to prevent any creeping tendency of the exterior rim relative to the wheel body, this being one of the features which is shown in our co-pending application. In the present embodiment these projections 22 are made in the form of two parallel ribs extending from the interior of the rim 7 and connected by cross members 23.

While the flanges 8 may be secured to the exterior rim 7 in any suitable way, we prefer the construction shown best in Figs. 3 and 5 wherein said rim is provided on each side with an annular groove 24, and the flanges 8 are each provided with the inturned lip 25 which is received in said groove, a suitable packing ring or gasket 26 being employed to make a tight joint. The flanges 8 are held in place by the clamping rings 27 which overlie the sides of the rim 7 and also engage the flanges 8. These clamping rings 27 are also used for holding in position the tire 28 which may be of rubber or of any suitable material. Said tire is shown as having the grooves 29 in its sides in which fit the inturned edges 30 of the clamping rings 27. These clamping rings are held in position by clamping bolts 31 which extend through apertures formed in the rim 7. Each of the flanges 8 is preferably formed with an annular pocket 32 in which is received a packing ring 33 that engages the flange 3 and makes a tight joint between the flanges.

It is our purpose to keep the space between the exterior rim and the wheel body filled or partially filled with oil or other suitable lubricant and the packing 26 and 33 serve to make sufficiently tight joints to prevent the lubricant from leaking out. The lubricant may be introduced in any suitable way, although we have shown for this purpose an opening 34 formed in one of the bolts 35 that connects the member 4 to the wheel felly 2. This bolt 35 is shown as having a cap nut 36 applied thereto which closes the oil duct 34.

Upon referring to Fig. 2 it will be seen that when load is applied to the wheel all of the springs come into play to support the load, and this we regard as a feature of considerable importance. The springs on the lower side of the wheel in Fig. 2 are placed under increased tension by reason of the fact that the lower portion of the exterior rim moves toward the wheel body. The springs on the upper side of the wheel are placed under increased tension through the action of the links 16. The springs at the sides of the wheel are also placed under more or less tension, partly due to the action of the links 16 and partly to the swinging movement of the lever 9. With our invention, therefore, all of the springs are active at all times to support the load and a much better result can be secured than where only a portion of the springs are active at any one time to support the load.

Having fully described our invention, what we claim as new and desire to secure by Letters Patent is:—

1. In a wheel, the combination with a wheel body, of a rigid non-yielding exterior rim, load-supporting members pivoted to one of said parts and having a sliding bearing against the other of said parts, a spring acting on each member to resist swinging movement of said members caused by a movement of any portion of the rim toward the wheel body, and means associated with each of said members to place the spring connected thereto under increased tension when the portion of the rim adjacent said member moves away from the wheel body.

2. In a wheel, the combination with a wheel body, of a rigid non-yielding exterior rim, a plurality of load-supporting members pivoted intermediate of their ends to the wheel body and adapted to bear at their outer ends against the rim, springs acting on the inner ends of each member and tending to swing the outer ends thereof outwardly, the springs for each member operating to resist the turning of said member due to a relative movement toward each other of the wheel body and exterior rim adjacent said member, and a connection between the inner end of each member and the rim which causes said member to turn against the action of its spring when the portion of said rim adjacent said member moves away from the wheel body, said connection freely permitting the first-named relative movement of said members whereby any load to which the wheel is subjected is sustained partially by the springs at the lower side of the wheel and partially by those at the upper side thereof.

3. In a wheel, the combination with a wheel body, of a rigid non-yielding exterior rim, a plurality of load-supporting members pivoted to the wheel body, springs acting on the load-supporting members tending to move the outer ends thereof outwardly against the rim, and a connection between each load-supporting member and the rim which causes said member to turn against the action of its spring when the adjacent portions of the wheel body and rim work away from each other.

4. In a wheel, the combination with a wheel body, of a rigid non-yielding exterior rim, a plurality of load-supporting members pivoted intermediate of their ends to the wheel body and adapted to bear at their outer ends against the exterior rim, springs acting on the inner ends of said members and tending to force the outer ends thereof outwardly, and links connecting the inner end of each member with the wheel rim.

5. In a wheel, the combination with a wheel body, of an exterior rim, a plurality of load-supporting members pivoted intermediate of their ends to the wheel body and adapted to bear at their outer ends against the exterior rim, springs acting on the inner ends of said members and tending to force the outer ends thereof outwardly, slotted links pivoted to the wheel rim, and pins carried by the inner ends of said load-supporting members and playing in said slots.

6. In a wheel, the combination with a wheel body having outwardly-extending flanges forming a space between them for receiving load-supporting members, of an exterior rim having an annular groove on each side, side plates overlapping the flanges on the wheel body and provided at their outer edges with inwardly-directed lips to enter the grooves in the wheel rim, means to clamp the side plates to the wheel rim, and pivotally-mounted load-sustaining members interposed between the wheel rim and body.

7. In a wheel, the combination with a wheel body having outwardly-extending separated flanges, of an exterior rim having an annular groove on each side, a packing ring in each groove, side plates overlapping the flanges on the wheel body and provided at their outer edges with inwardly-directed lips to enter the grooves in the wheel rim and engage the packing ring, means to clamp the side plates to the wheel rim, and pivotally-mounted load-supporting members interposed between the wheel body and rim.

8. In a wheel, the combination with a wheel body, of a rigid non-yielding exterior rim, a plurality of load-supporting members pivoted intermediate of their ends to one of said parts, springs connected to said members and tending to resist turning movement thereof in one direction, and connections between said members and the part to which they are pivoted whereby all of the springs are placed under increased tension whenever the rim has a movement relative to the wheel body in any direction.

9. In a wheel, the combination with a wheel body, of a rigid non-yielding exterior rim, a plurality of load-supporting members pivoted to the wheel body and adapted to bear against the rim, springs acting on said load-supporting members and tending to move the outer ends thereof outwardly against the rim, and means associated with said members to cause the load to be supported at all times on all the springs regardless of their position in the wheel.

10. In a wheel, the combination with a wheel body, of a rigid non-yielding exterior rim, a plurality of load-supporting members pivoted intermediate of their ends to the wheel body and adapted to bear at their outer ends against the rim, springs connected to the inner ends of said members and tending to swing the outer ends thereof outwardly, and connections between the inner end of each member and the rim whereby each spring is placed under increased tension whenever the rim and wheel body have a movement relative to each other laterally of the axis of the wheel in any direction.

11. In a wheel, the combination with a wheel body, of an exterior rim separate therefrom, a plurality of load-supporting levers pivoted intermediate of their ends to one of said parts and adapted to engage the periphery of the other part, said levers being arranged in pairs and the levers of each pair being oppositely disposed, contracting spiral springs acting on the ends of the levers of each pair and tending to draw said ends toward each other, and connections between said ends of said levers and one of said parts whereby all the springs are placed under increased tension whenever the rim has a movement relative to the wheel body in any direction.

12. In a wheel, the combination with a wheel body, of a rigid non-yielding exterior rim, a plurality of load-supporting members pivoted intermediate of their ends to the wheel body and adapted to bear at their outer ends against the rim, said members being arranged in pairs, with the members of each pair oppositely disposed, contracting spiral springs connected to the inner ends of the members of each pair and tending to draw said ends toward each other, and connections between each member and the rim whereby the springs connected therewith are placed under increased tension whenever the rim and wheel body have a movement relative to each other laterally of the axis of the wheel in any direction.

13. In a wheel, the combination with a wheel body, of an exterior rim, a plurality of load-supporting members pivoted intermediate of their ends to one of said parts and each adapted to bear at one end against the other part, spiral springs connected to the other ends of said members and tending to force them against the first-named part, and connections between said members and one of the parts thereby to place all of the springs under increased tension whenever the rim has a movement relative to the wheel body in any direction.

In testimony whereof, we have signed our names to this specification, in the presence of two subscribing witnesses.

JOHN A. STAHLE.
CARL W. STAHLE.

Witnesses:
LOUIS C. SMITH,
THOMAS J. DRUMMOND.

Copies of this patent may be obtained for five cents each, by addressing the "Commissioner of Patents, Washington, D. C."

Correction in Letters Patent No. 1,124,350.

It is hereby certified that in Letters Patent No. 1,124,350, granted January 12, 1915, upon the application of John A. Stahle, of Boston, and Carl W. Stahle, of Everett, Massachusetts, for an improvement in "Resilient Wheels," an error appears in the printed specification requiring correction as follows: Page 3, line 106, for the word "work" read *move;* and that the said Letters Patent should be read with this correction therein that the same may conform to the record of the case in the Patent Office.

Signed and sealed this 2nd day of February, A. D., 1915.

[SEAL.]

R. F. WHITEHEAD,

*Acting Commissioner of Patents.*